United States Patent [19]

Hertfelder et al.

[11] 4,251,052

[45] Feb. 17, 1981

[54] FLUID FLOW CONTROL VALVE ESPECIALLY FOR USE IN HEATING INSTALLATIONS FOR MOTOR VEHICLES AND A METHOD OF ASSEMBLING AND ADJUSTING THE VALVE

[75] Inventors: Wilhelm Hertfelder, Steinenbronn; Erich Junginger, Stuttgart, both of Fed. Rep. of Germany

[73] Assignee: Robert Bosch GmbH, Stuttgart, Fed. Rep. of Germany

[21] Appl. No.: 89,905

[22] Filed: Oct. 30, 1979

[30] Foreign Application Priority Data

Nov. 3, 1978 [DE] Fed. Rep. of Germany ....... 2847748

[51] Int. Cl.³ .............................................. F16K 31/06
[52] U.S. Cl. .................................................... 251/129
[58] Field of Search ................................ 251/129, 141

[56] References Cited

U.S. PATENT DOCUMENTS

| | | | |
|---|---|---|---|
| 3,431,028 | 3/1969 | Yoder | 251/129 |
| 3,791,408 | 2/1974 | Saitou et al. | 251/129 X |
| 3,829,060 | 8/1974 | von Lewis | 251/129 |
| 4,058,255 | 11/1977 | Linder et al. | 236/91 F |

*Primary Examiner*—Arnold Rosenthal
*Attorney, Agent, or Firm*—Michael J. Striker

[57] ABSTRACT

A fluid control valve, controlling flow of hot water through a heating arrangement for motor vehicles, comprises a pot-shaped guide sleeve in which the armature of an electromagnet is movable in axial direction, and to which a valve member is connected by a push rod, which extends through an axial bore of a magnet core fixed in the guide sleeve. The facing ends of armature and core are spaced a small distance when the valve member engages a valve seat in the valve housing between an inlet and an outlet socket. The guide sleeve is flowed through by water passing through the valve. The magnet core is clamped in the guide sleeve with a clamping force greater than the axial force acting on the core. The magnet core is positioned in the guide sleeve by first moving the core closer to the armature and then imparting to the latter a predetermined axial force in closing direction of the valve. The armature strikes the core with the great sudden impact and displaces the core until the valve member is pressed with a predetermined force against the valve seat to thus absorb the axial force. Thereafter the desired distance will be maintained when the normal closing force is applied to the armature. The valve member is normally held in open position by a coil spring and the opening stroke of the valve member is limited by a rubber disk abutting against a planar sieve disk fixed to the valve housing between the core and the valve member. The sieve disk, is supported by a bowl-shaped spacer member.

35 Claims, 1 Drawing Figure

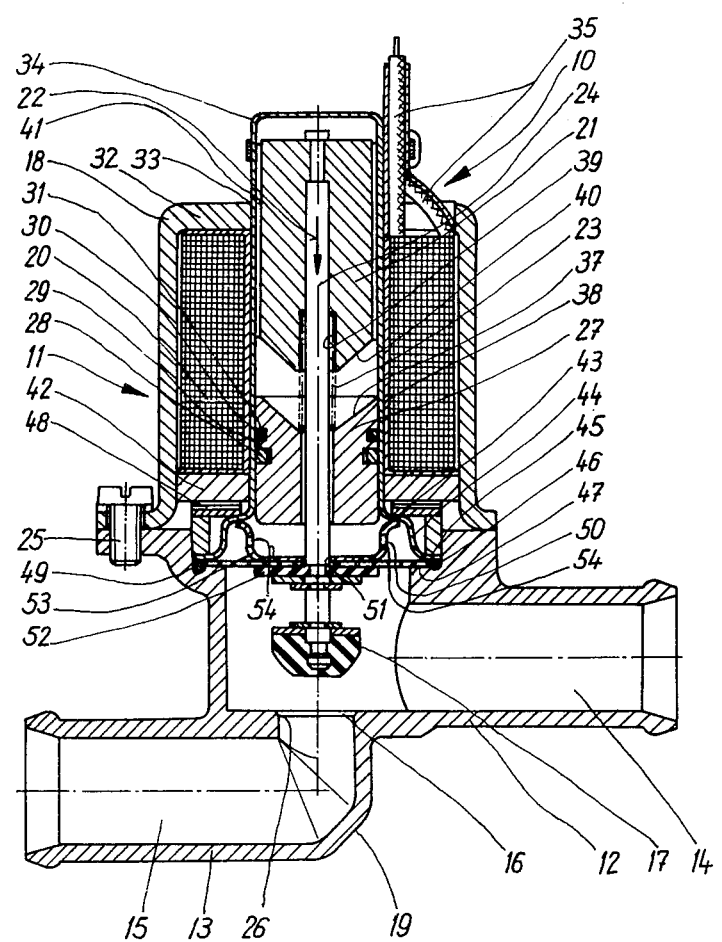

1

FLUID FLOW CONTROL VALVE ESPECIALLY FOR USE IN HEATING INSTALLATIONS FOR MOTOR VEHICLES AND A METHOD OF ASSEMBLING AND ADJUSTING THE VALVE

BACKGROUND OF THE INVENTION

The present invention relates to a fluid flow control valve, especially for use in heating installations of motor vehicles, which is arranged in a conduit feeding water to a heat exchanger and in which the means for moving the valve member between an open and a closed position comprise an electromagnet controlled by a temperature regulating device. Such a value is for instance disclosed in the U.S. Pat. No. 4,058,255, in which a working space of the valve can be placed either at atmospheric pressure or at a pressure below the atmospheric pressure so as to move the valve member at a pressure below atmospheric pressure in the working space against the action of a compression spring to the open position. The pressure in the working space is controlled by an electromagnet cooperating with a closure member for closing and opening a conduit communicating with the working space and adapted to place the interior thereof at a pressure below atmospheric pressure. In heating arrangements for motor vehicles the flow of water to the heat exchanger is controlled in dependence on the temperature in the interior of the vehicle and the temperature of the heat exchanger. This requires a fluid-flow control valve which carries out regulating impulses imparted thereto from a temperature regulator with the smallest possible delay. Especially in divided heat-water circuits, that is a separated heat-water circuit for the left and the right half of the vehicle, the amount of water for heating passing through each of the circuits is only half of the total amount of water. In such an arrangement an exact sensitivity of response of the valve is necessary for proper dosage of each circuit. It is also desirable that during the operation of the vehicle, the continuously changing conditions, such as water pressure and system pressure, have the least possible influence on the fluid-flow control valve. It is further desirable that the danger of leaks and resulting water loss is definitely prevented. In addition it is desirable that the fluid-flow control valve will properly function even if the water passing therethrough carries impurities, such as dirt or sand. It is further desirable that the fluid-flow control valve is maintained in its open position when the electromagnet controlling the valve member is deenergized and that the energy requirements for energizing the electromagnet be as small as possible and that the valve may be constructed in a compact manner of relatively small weight and with perfect safety of function. All these criteria are not accomplished by the fluid-flow control valve disclosed in the aforementioned patent.

SUMMARY OF THE INVENTION

It is an object of the present invention to provide a fluid-flow control valve, especially for use in a heating installation for a motor vehicle, which satisfies the above-mentioned criteria for a perfectly operating fluid-flow control valve.

With these and other objects in view, which will become apparent as the description proceeds, the fluid-flow control valve according to the present invention, especially for use in a heating installation for motor vehicles, mainly comprises a closed housing having a water inlet socket and a water outlet socket defining therebetween a valve seat, a valve member movable between a closed position engaging the valve seat and preventing flow of water from the inlet socket to the outlet socket and an open position, means for moving the valve member to the closed position and comprising an electromagnet having a magnet spool, a plunger-type armature axially movable in the valve spool, a rod arranged coaxially to the valve seat and fixed at one end to the armature for movement therewith and carrying fixed to the other end thereof the valve member, a magnet core arranged coaxial with the armature between the latter and the valve member, through which the afore-mentioned rod passes with clearance, a compression spring abutting with opposite ends against the armature and the magnet core and normally holding the valve member in the open position, a cup-shaped guide sleeve constructed of non-magnetic or only weakly magnetizable material in the housing and guiding with its inner surface the armature for movement in axial direction, in which the guide sleeve communicates at one end with a space in the housing between the inlet and the outlet socket. The armature is preferably provided at its outer periphery with axially extending grooves permitting flow of water from the one to the opposite closed end of the cup-shaped guide sleeve and the magnet core is held with a predetermined force in the guide sleeve with the end thereof facing the armature at a distance from the latter which, when the valve member is in the closed position, is at most only slightly greater than the wear of the valve member after a predetermined time of use.

The fluid-flow control valve according to the present invention has, as compared with the valve disclosed in the aforementioned U.S. patent, the following advantages. It is held in the open position when the electromagnet is not energized and may be held in the open position by the fluid stream passing therethrough even if the opening spring should break. When the electromagnet is energized it will move the valve member quickly to the closed position, whereby the energy for energizing the electromagnet is very small. Since the axial distance between the armature and the magnet core at the open valve is held as small as possible, the power applied by the electromagnet is used in the best manner. Due to the small axial distance between the armature and the magnet core in the closed position of the valve, there will result not only a high efficiency of the electromagnet, but also a simplification of the manufacture of the valve, due to permissible increased tolerances in its production. The valve of the present invention has a high sensitivity of response, while assuring finest dosage. Even if the water passing through the valve carries impurities, such as dirt or sand, a trouble-free operation of the valve will be assured. The valve of the present invention is compact in its construction; has relatively small weight and will operate trouble-free under extended use.

The predetermined force at which the valve core is held in the guide sleeve is adjusted in such a manner that the force for overcoming said holding force is greater than the axial force acting on the valve member during movement of the latter between the positions thereof. The force for overcoming the holding force at which the magnet core is held in the guide sleeve is, for instance, about 15–20 kp, which is not reached during normal operation of the valve, that is during opening and closing of the valve member.

Preferably the valve core is held in the guide sleeve by a radially expanding snap ring located in a groove of the valve core and engaging the inner surface of the guide sleeve. If the holding force produced by this snap ring should not be great enough, then the holding force may be increased by an adhesive located in an annular gap between the magnet core and the guide sleeve. In such a construction the magnet core is preferably formed with an annular groove in which a sealing ring is located to thereby prevent the adhesive to penetrate towards the armature.

The magnet spool preferably extends axially over a major portion of the guide sleeve and engages with its inner peripheral surface the outer peripheral surface of the latter. The housing preferably comprises a pot-shaped part of magnetizable material, for instance steel, and having a peripheral wall enclosing the magnet spool at its outer peripheral surface and an end wall abutting against the end of the magnet spool which faces away from the valve member. The housing preferably includes a second housing part, comprising the aforementioned inlet and outlet socket, and the pot-shaped housing part abuts against the second housing part and is releasably connected thereto by screws or the like, which leads to a simple construction of small weight.

The cup-shaped guide sleeve preferably projects with its closed end through an opening in the end wall of the pot-shaped housing part and the arrangement includes sealing means, sealing the annular gap in the region where the guide sleeve passes through the end wall of the pot-shaped housing part. In addition there is arranged a ring of magnetizable material closing the magnetic circuit arranged in the pot-shaped housing part at the end of the magnet spool which faces the valve member. The guide sleeve preferably has at an open end thereof facing the valve member an annular outwardly projecting shoulder and the arrangement preferably includes a compression spring, in form of a corrugated spring washer, abutting with opposite ends against the aforementioned shoulder and this ring.

The guide sleeve preferably includes a cylindrical portion of larger diameter in the remainder of the guide sleeve extending from the shoulder towards the second housing part and ending in a radially outwardly extending flange and the second housing part is formed wih a seat for this flange. The arrangement includes also a sealing ring sandwiched between the flange and the aforementioned seat, to prevent water in the second housing part to pass into the first housing part.

The arrangement preferably includes also a supporting ring centered in a portion of the second housing part and abutting with one end thereof against that side of the aforementioned flange which faces away from the sealing ring and the corrugated spring washer abutting against the other end of this supporting ring.

The valve includes further a sieve disk clamped between the aforementioned seat and the flange and being formed with a central opening through which the rod extends with clearance.

Preferably the valve includes also an abutment disk of elastic material, fixed to the rod between the valve member and the sieve disk, and abutting against the latter in the open position of the valve member to thus limit the opening stroke of the latter. In addition, the abutment disk has a positive influence on the characteristic curve of the valve in that it produces during closing of the valve a servo function which keeps the through-flow at high water pressure relatively constant.

Preferably the valve includes also a support member axially spaced from the end of the magnet core which faces away from the armature and abutting with one end thereof against the shoulder formed in the guide sleeve and with the other end against the sieve disk.

In constructing the valve of the present invention, respectively in adjusting the position of the magnet core in the guide sleeve, the magnet core is first pushed into the guide sleeve toward the armature to be spaced from the latter at a distance smaller than the distance it occupies when the valve member is in the closed position, after which all elements of the valve are assembled and subsequently thereto an axial force is applied onto the armature in valve closing direction of such a magnitude that the valve member is pressed against the valve seat which is thereby elastically compressed so that the facing ends of the armature and the magnet core will engage each other to thereby axially displace the latter to its desired end position. The aforementioned axial force for axially displacing the magnet core may be produced by momentarily exciting the magnet coil with a current essentially greater than the normal operating current, to thereby cause the armature to strike with a hammer blow against the magnet core. On the other hand, the axial force for displacing the magnet core may be produced by an external force and in this case the closed end of the cup-shaped guide sleeve is provided with an opening and the external force is applied onto the armature through this opening, whereafter the opening is again tightly closed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE of the drawing illustrates the fluid-flow control valve according to the present invention in axial cross-section, with the valve member shown in open position.

DESCRIPTION OF THE PREFERRED EMBODIMENT

The fluid-flow control valve as shown in the drawing is especially suitable for installation in an air conditioning system of a motor vehicle, especially a heating system as shown in the U.S. Pat. No. 4,058,255. Thereby the valve is located in a conduit feeding water to a non-illustrated heat exchanger. The means for opening and closing the valve comprise an electromagnet, which is controlled from a temperature regulating device of the air conditioning system, especially a heating system.

It is, however, to be understood that the valve according to the present invention is not limited to the use in a motor vehicle air conditioning system, but may also be used for various different applications.

The valve shown in the drawing comprises a closed two-part housing 11, composed of a pot-shaped housing part 18 and an additional housing part 19. The pot-shaped housing part 18 is made from magnetizable material, for instance steel. It is mounted on the lower housing part 19 and releasably connected by screws 25 thereto. The housing part 19 is provided with an integral inlet socket 12 and an outlet socket 13, between the inlet space 14, respectively the discharge space 15, of which a flow-through opening 16 with a valve seat 26 is formed.

In the interior of the housing 11 there is a movable closure member with a valve member 17 in form of a frustoconical plug from elastic material, for instance rubber. The valve member 17 closes in the closed position of the valve the flow-through opening 16 and opens the same when moved to the open position.

The means for moving the valve member 17 comprises an electromagnet 10, having a magnet spool 20 and a plunger-type armature 21, coaxially arranged with respect thereto and axially movable in closing direction as indicated by the arrow 22 against the action of a cylindrical coil compression spring 23. A push rod 24 is fixedly connected to the armature 21, coaxial with the latter and with the flow-through opening 16, and the rod is, due to the axial guiding of the armature, also substantially coaxially guided with respect to the flow-through opening 16. The rod 24 carries at the end thereof, which is opposite the armature 21, the valve member 17 fixedly connected thereto.

A fixed magnet core 27 is arranged between the armature 21 and the valve member 17 coaxial with both of these elements. The magnet core 27 is provided at the end thereof facing the armature 21 with frustoconical depression 37, which tapers in the direction towards the valve member 17 and which is continued by an axial bore 38 through which the rod 24 passes with clearance and through which the space above the magnet core 27 communicates with the water containing interior of the housing part 19. The lower end of the depression 37 of the magnet core 27 forms an abutment for the lower end of the opening spring 23. The latter surrounds the rod 24 and engages with its upper end an annular axial cutout 39 formed in the armature 21.

The armature 21 has a frustoconical end portion 40 facing the depression 37 of the magnet core 27. The remaining portion of the armature is substantially cylindrical and provided at its outer peripheral surface with a plurality of circumferentially spaced, axially extending grooves 41.

The magnet core 27 and the armature 21 have the same outer diameter. It is of special importance that the armature 21 as well as the magnet core 27 are enclosed by an outwardly closed, elongated cup-shaped guide sleeve 34, which consists of only slightly magnetizable or non-magnetizable material, especailly brass. The guide sleeve 34 forms with its inner peripheral surface thereof a coaxial guide for the armature 21 and communicates at its lower end with the water passing through the housing part 19 so that this water may flow through the grooves 41 past the armature 21 from the lower end of the latter, as viewed in the drawing, to the upper end thereof and also in the reverse direction. The grooves 41 thereby facilitate such flow of water. The peripheral surface of the armature 21 which is in contact with the inner peripheral surface of the guide sleeve 34 is thus considerably reduced by the grooves 41. The friction between the guide sleeve 34 and the armature 21 is thus reduced. The grooves 41 have further the advantage that any dirt particles contained in the water will be deflected by the fluid stream passing through the grooves 41 and will, therefore, not cling to the guide surface between armature 21 and guide sleeve, so as not to increase the friction. A jamming of the armature 21 is thus positively prevented.

The magnet core 27 is held tightly on the inner surface of the guide sleeve 34 so that the displacement force for displaying the magnet core 27 in axial direction is at least of a magnitude of about 15–20 kp. Furthermore, the magnet core is in axial direction adjusted relative to the armature 21 so that the end face of the magnet core 27 provided with the depression 37 and facing the frustoconical end portion of the armature 21 had a fixed predetermined distance from the latter. This axial distance is adjusted in such a manner, that in the closed position of the valve, not shown in the drawing, in which the valve member engages the valve seat 26 of the flow-through opening 16 to close the latter, the remaining axial distance between the frustoconical surfaces 40 and 37 is equal to or only slightly greater than the wear of the frustoconical valve member 17 after a predetermined time of use. This means, that the armature 21 abuts with its end portion 40 in the closed position of the valve against the surface defining the depression 37 only when the valve member 17 is worn and has to be exchanged against a new one.

The holding force at which the magnet core 27 is held in the interior of the guide sleeve 34 against axial displacement is adjusted in such a manner that the necessary force to overcome the holding force is greater than any thereon acting axial force during normal opening and closing operation of the valve. This means, that the opening stroke of the armature 21 with the rod 24 and the valve member 17 could be limited by abutment of the armature 21 against the magnet core 27 without displacing the latter from its adjusted position.

The holding of the magnet core 27 in its adjusted axial position relative to the inner peripheral surface of the guide sleeve 34 is performed by a radially outwardly springing snap ring 28 held in an annular groove 29 of the magnet core 27 and clampingly engaging the inner peripheral surface of the guide sleeve 34. If this arrangement is not sufficient for maintaining the adjusted axial position of the magnet core 27, then the latter may be additionally secured against axial displacement in the guide sleeve 34 by other securing means, for instance an adhesive. Such an adhesive is placed in the annular gap between the outer peripheral surface of the magnet core 27 and the inner peripheral surface of the guide sleeve 34. In order to prevent the adhesive, applied in the liquid state, to penetrate into the region of the armature 27, the annular gap containing the adhesive is sealed in the direction towards the armature 21 by means of an O-ring 30 held within an annular groove 31 in the magnet core 27.

The guide sleeve 34 is surrounded over a major portion of its axial length by the magnet spool 20, which is directly built onto the outer peripheral surface of the guide sleeve 34. The magnet spool 20 is arranged within the housing portion 18, which peripherally surrounds the magnet spool 20 and which abuts also against the latter at the end thereof facing away from the valve member 17. The end wall 32 of the housing portion 18 is formed with an opening through which the upper cup-shaped part of the guide sleeve 34 passes. The annular gap 33 formed at this location, as well as the opening through which the connecting cables 35 for the magnet spool 20 pass to the exterior of the housing, are sealed with sealing means, for instance silicone rubber.

A ring 42 of magnetizable material is arranged in the interior of the housing part 18, abutting against the end of the magnet spool 20 which faces the valve member 17. The ring 42 closes the magnetic circuit created during energizing of the magnet spool 20.

The guide sleeve 34 is provided, at its open end facing the valve member 17, with a radially outwardly extending annular shoulder 43, which passes over in an annular section 44 having a larger diameter than the remainder of the guide sleeve, in which the armature 21 and the magnet core 27 are arranged. The annular section 44 ends in a radially outwardly extending flange 45 by means of which the guide sleeve rests on a seat 47 of the housing part 19, with an O-ring sandwiched between the flange 45 and the seat 47. In this way the interior of the housing part 19 and the cup-shaped guide sleeve 34 are sealed relative to the housing part 18 and the magnet spool 20 contained therein.

An axial pressure spring 48, in form of a corrugated spring washer, is located in the axial region between the annular shoulder 43 of the guide sleeve 34 and the ring 42 and the spring 48 abuts with opposite faces thereof on the shoulder 43 and on the ring 42. A supporting ring 49, centered by the housing part 19, abuts with one of its end of against the face of the flange 45 facing away from the O-ring 46 and with its other axial end against the spring washer 48.

A planar sieve disk 50 is fixedly arranged in the region of the seat 47 in the housing part 19. The sieve disk 50 is provided with a central opening 51 through which the rod 24 passes with clearance. The sieve disk 50 is, for instance, clamped between the flange 45 and the housing seat 47.

An important feature of the valve according to the present invention is the provision of an abutment disk 52 of elastic material, expecially rubber, which is fixedly connected to the rod 24 axially spaced from the valve member 17. The abutment disk 52 serves to limit the opening stroke of the rod 24 with the armature 21 and the valve member 17. In the open position of the valve, shown in the drawing, the abutment disk 52 abuts against the sieve disk 50. The abutment disc 52 moves in a cylindrical portion of the housing part 19 coaxial with the rod 24 and has a diameter which is about 0.65-0.7 times the diameter of the cylindrical portion. Thereby an additional advantage is provided by the abutment disk 52 is that the latter, during closing of the valve, produces a servo action by means of which the flow-through amount at high water pressure is held relatively constant. This has a favorable influence on the regulation which is to be accomplished by the fluid-flow control valve according to the present invention.

A support member, shown in the drawing as a bowl-shaped spacer member 53, is arranged in the axial region between the sieve disk 50 and the end of the magnet core 27 facing the sieve disk. The spacer member 53 abuts with its open end against the shoulder 43 of the guide sleeve 34 and with its other flat end against the sieve disk 50. This will assure that the forces limiting the opening stroke of the movable elements of the valve will not act on the magnet core 27. The bottom of the spacer member 53 is provided with a central opening through which the rod 24 passes with clearance. The spacer member 53 is further formed in the region of its bottom and in the side thereof with a plurality of openings 54 permitting flow of water therethrough.

The valve member 17 has a frustoconical end portion adapted to engage the valve seat 16 and the cone angle of this end portion is chosen, in dependency on the adjusted axial distance between magnet core 27 and armature 21, in such a manner that during closing movement of the valve the valve member 17 sealingly engages the valve seat 26 before the end portion 40 of the armature engages the surface defining the depression 37 in the magnet core 27. As mentioned before, the thereby resulting axial distance between the end portion 40 and the surface defining the depression 37 is equal or slightly greater than the wear of the valve member 17 after a predetermined time of use of the same. The aforementioned axial distance is in the order of about 0.3–0.7 millimeters.

During the manufacture of the above-described fluid-flow control valve, especially during adjustment of the mentioned axial distance between magnet core 27 and the armature 21, one proceeds as follows:

At first the magnet core 27 is moved from the open end of the guide sleeve 34 into the latter further than corresponds to the final axial position of the magnet core 27 in the guide sleeve. Subsequently thereto all described elements of the valve will be assembled and thereafter an axial force of predetermined magnitude in the direction of the arrow 22 is applied onto the armature 27. This force, which has to be greater than the holding force holding the magnet core 27 against axial displacement, will press the valve member 17 against the valve seat 16 and resiliently compress the compressable portion thereof, whereby the armature 21 abuts with its end portion 40 against the surface defining the cavity 37 of the magnet core 27, so that the armature 21 displaces the magnet core 27 under the action of the axial force in the direction of the arrow 21 in axial direction into the desired adjusted position.

The necessary axial force for adjusting the position of the magnet core can, for instance, be produced in that the magnet spool 20 is momentarily excited with a current considerably greater than the normal operating current, so that the armature 21 will strike the magnet core 27 with a hammer-like blow. The armature displaces thereby the magnet core 27 until the valve member 17 engages the valve seat 26 and due to its elasticity absorbs, after a certain compression, the axial impact. At normal operating current a uniform distance between armature 21 and magnet core 27 will thus be maintained, which distance is relatively small and determines in an advantageous manner the valve closing force and therewith the maximum water pressure which may be controlled.

On the other hand, the predetermined axial force for displacing the magnet core 27 to its finally adjusted position may be provided by an outer force, for instance by a force applied through an opening made in the upper closed end of the guide sleeve 34. Such an outer force, applied in the direction of the arrow 22 onto the armature 21 to press the valve member with the predetermined force and simultaneous compression against the valve seat 26, will thus displace the magnet core 27 to the adjusted position, which will provide upon application of a normal closing force onto the armature 21 the desired axial small distance between armature 21 and magnet core 27. After the magnet core 27 is displaced to its desired final position, the opening formed in the upper end of the guide sleeve 34 has to be closed again in any well-known manner.

If the magnet core 27 is not properly held in the adjusted axial position by the radially expanding snap ring 28, then an adhesive may be applied to the core before, during or after placing the magnet core 27 into the guide sleeve, which after the magnet core is placed in the proper adjusted position will slowly harden to thus additionally secure the magnet core in the adjusted position. It is to be understood that during the above-described operating steps the axial force applied has to be large enough so as to displace the magnet core 27. This axial force may be chosen as a magnitude of about 15 to 20 kp.

The operation of the valve will be evident from the above-described description and, therefore, it is believed unnecessary to describe the operation in further detail.

It will be understood that each of the elements described above, or two or more together, may also find a useful application in other types of fluid-flow control valve differing from the types described above.

While the invention has been illustrated and described as embodied in a fluid-flow control valve especially for use in heating installations of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid-flow control valve, especially for use in a heating installation for motor vehicles, comprising a closed housing having a water inlet socket and a water outlet socket and defining therebetween a valve seat; a valve member movable between a closed position engaging said valve seat and preventing flow of water from said inlet socket to said outlet socket and an open position; means for moving said valve member to said closed position and comprising an electromagnet having a magnet spool, a plunger-type armature axially movable in said valve spool, a rod arranged coaxially to said valve seat and fixed at one end to said armature for movement therewith and carrying fixed to the other end thereof said valve member; a magnet core arranged coaxial with said armature between the latter and said valve member through which said rod passes with clearance; means normally holding said valve member in said open position and comprising a compression spring abutting with opposite ends respectively against said armature and said magnet core; and a cup-shaped guide sleeve of at most weakly magnetizable material in said housing and guiding with its inner peripheral surface said armature for movement in axial direction, said guide sleeve communicating at one end with the space in the housing between said inlet and said outlet socket, and said armature being provided on its outer peripheral surface with axially extending grooves permitting flow of water from said one to said opposite closed end of said cup-shaped guide sleeve, said magnet core being held with a predetermined force in said guide sleeve with the end thereof facing said armature at a distance from the latter, which, when said valve member is in said closed position, is at most only slightly greater than the wear of the valve member after a predetermined time of its use.

2. A valve as defined in claim 1, wherein said predetermined force at which said magnet core is held in said guide sleeve is adjusted in such a manner that the force for overcoming said holding force is greater than the axial force acting on said valve member during movement of the latter between the positions thereof.

3. A valve as defined in claim 1, wherein said magnet core is held in said guide sleeve at said distance by a radially expanding snap ring located in a groove of said magnet core and engaging the inner peripheral surface of said guide sleeve.

4. A valve as defined in claim 2, wherein said magnet core is held at said distance in said guide sleeve by an adhesive located in an annular gap between the outer peripheral surface of said magnet core and the inner peripheral surface of said guide sleeve.

5. A valve as defined in claim 4, wherein said magnet core is formed with an annular groove and including a sealing ring in said groove, said adhesive being applied in said gap at the side of said sealing ring facing away from said armature to prevent said adhesive to penetrate towards said armature.

6. A valve as defined in claim 1, wherein said magnet spool extends axially over a major portion of said guide sleeve and engages with its inner peripheral surface thereof the outer peripheral surface of said guide sleeve.

7. A valve as defined in claim 1, wherein said housing comprises a pot-shaped part of magnetizable material having a peripheral wall enclosing said magnet spool at its outer peripheral surface and an end wall abutting against the end of said magnet spool which faces away from said valve member.

8. A valve as defined in claim 7, wherein said pot-shaped housing part is formed from steel.

9. A valve as defined in claim 7, wherein said housing includes a second housing part comprising said inlet and said outlet socket, said pot-shaped housing part abutting against said second housing part and being releasably connected thereto.

10. A valve as defined in claim 7, wherein said cup-shaped guide sleeve projects with its closed end through an opening in said end wall of said pot-shaped housing part, and including sealing means sealing the annular gap in the region where said guide sleeve passes through said end wall of said pot-shaped housing part.

11. A valve as defined in claim 10, wherein said sealing means is silicone rubber.

12. A valve as defined in claim 9, and including a ring of magnetizable material closing the magnetic circuit created during energizing of said magnet spool, said ring being arranged in said pot-shaped housing part at the end of said magnet spool which faces said valve member.

13. A valve as defined in claim 12, wherein said guide sleeve has at an open end thereof facing said valve member an annular outwardly projecting shoulder and including a compression spring in form of a currugated spring washer abutting with opposite ends against said shoulder and said ring.

14. A valve as defined in claim 13, wherein said guide sleeve includes a cylindrical portion of larger diameter than the remainder of said guide sleeve extending from said shoulder towards said second housing part and ending in a radially outwardly extending flange, said second housing part being formed with a seat for said flange, and including a sealing ring sandwiched between said flange and said seat to prevent water in said second housing part to pass into said first housing part.

15. A valve as defined in claim 14, and including a supporting ring centered in a portion of said second housing part and abutting with one end thereof against that side of said flange which faces away from said sealing ring, said corrugated spring washer abutting against the other end of said support ring.

16. A valve as defined in claim 14, and including a sieve disk clamped between said seat and said flange and being formed with a central opening through which said rod extends with clearance.

17. A valve as defined in claim 16, and including an abutment disk fixed to said rod between said valve member and said sieve disk and abutting against the latter in the open position of said valve member.

18. A valve as defined in claim 17, wherein said abutment disk is of elastic material.

19. A valve as defined in claim 17, wherein said second housing part has between said inlet and said outlet socket a cylindrical portion coaxial with said rod of a predetermined diameter and wherein said abutment disc has a diameter which is about 0.65–0.7 times said predetermined diameter, whereby said abutment disk acts as a servo control disk which during closing of the valve keeps the throughput volume at high fluid pressure substantially constant.

20. A valve as defined in claim 16, and including a support member axially spaced from said end of said magnet core which faces away from said armature and abutting with one end against said shoulder and with said other end against said sieve disk.

21. A valve as defined in claim 20, wherein said support member is constituted by a bowl-shaped spacer member located within said cylindrical portion of said guide sleeve and having a substantially flat bottom abutting against said sieve disk and about its open end an outwardly extending flange portion abutting against said shoulder of said guide sleeve.

22. A valve as defined in claim 21, wherein said bottom of said spacer member is provided with a central opening through which said rod extends with clearance.

23. A valve as defined in claim 21, wherein said spacer member is provided with a plurality of openings for the passage of water therethrough.

24. A valve as defined in claim 1, wherein said valve member comprises a frustoconical portion of rubber elastic material having a cone angle so that during movement of the valve member to its closed position, said valve member will sealingly engage said valve seat before said armature engages said magnet core.

25. A valve as defined in claim 1, wherein said armature is provided about a portion of the rod extending therethrough with an axial extending cutout of larger diameter than said rod so as to form in said armature an annular space about a portion of the rod, said compression spring being a coil compression spring extending about said rod and with an end portion thereof into said annular space.

26. A valve as defined in claim 1, wherein said magnet core is provided with a frustoconical central depression extending into said magnet core from the end thereof facing said armature and tapering towards the other end of said magnet core and with an axial bore extending from the small end of the depression to the other end of said magnet core, said rod extending with clearance through said axial bore.

27. A valve as defined in claim 26, wherein said armature has a central frustoconical end portion facing said depression and having a cone angle substantially equal to that of said depression.

28. A method for the production of a fluid-flow control valve having a housing with a water inlet and a water outlet socket and a valve seat therebetween, a valve member formed at least in part from elastically compressable material movable between a closed position engaging the valve seat and an open position, means for moving said valve member to said closed position and comprising an electromagnet having a plunger-type armature guided for movement in axial direction in a pot-shaped elongated guide sleeve surrounded by the magnet coil of the electromagnet and an axial rod fixed at one end to said armature and carrying at the other end thereof said valve member for movement therewith, a magnet core in said guide sleeve through which said rod extends with clearance and being held in said guide sleeve with a predetermined force against axial displacement, with one end of the core spaced from the facing end of the armature at a predetermined distance which, when the valve member is in said closed position, is at most only slightly greater than the wear of the valve member after a predetermined time of use of the latter, and a coil compression spring about said rod between said core and said armature and normally holding the valve member in the open position, said method comprising the steps of moving said core from the open end of said cup-shaped guide sleeve into the latter toward the armature to be spaced from the latter at a distance smaller than said predetermined distance; assembling all parts of said valve member; subsequently applying an axial force onto said armature in valve closing direction of such a magnitude that the valve member is pressed against the valve seat while being elastically compressed to thus engage the facing ends of said armature and said magnet core with each other to thereby axially displace the latter to its desired adjusted position.

29. A method as defined in claim 28, wherein said axial force for axially displacing said magnet core is produced by momentarily exciting said magnet coil with a current essentially greater than the normal operating current to thereby cause said armature to strike with a hammer blow against said magnet core.

30. A method as defined in claim 28, wherein said axial force for axially displacing said magnet core is produced by an external force and including the steps forming in the closed end of said cup-shaped guide sleeve an opening; applying through said opening said external force onto said armature to displace thereby said magnet core by engagement with said armature; and thereafter tightly closing again said opening.

31. A method as defined in claim 28, and including the step of applying between the inner peripheral surface of said guide sleeve and the outer peripheral surface of said magnet core an adhesive which hardens after the latter has been brought to its adjusted position.

32. A method as defined in claim 31, wherein said adhesive is applied during insertion of said magnet core into said guide sleeve.

33. A method as defined in claim 31, wherein said adhesive is applied after said magnet core has been inserted in said guide sleeve.

34. A method as defined in claim 28, wherein said axial force is chosen at a magnitude equal to a force required to axially displace said core after it has been secured to said guide sleeve.

35. A method as defined in claim 34, wherein said axial force is of a magnitude of about 15–20 kp.

* * * * *